United States Patent [19]

Appel

[11] Patent Number: 4,756,157
[45] Date of Patent: Jul. 12, 1988

[54] CONTROL DEVICE FOR A HYDROSTATIC GEAR

[75] Inventor: Wilhelm Appel, Ulm-Donaustetten, Fed. Rep. of Germany

[73] Assignee: Hydromatik GmbH, Fed. Rep. of Germany

[21] Appl. No.: 924,685

[22] Filed: Oct. 29, 1986

[30] Foreign Application Priority Data

Nov. 5, 1985 [DE] Fed. Rep. of Germany ....... 3539220

[51] Int. Cl.[4] ............................................. F16D 31/02
[52] U.S. Cl. ........................................ 60/444; 60/452; 60/488
[58] Field of Search ................. 60/443, 444, 452, 487, 60/488; 417/218–222

[56] References Cited

U.S. PATENT DOCUMENTS

| | | | |
|---|---|---|---|
| 3,999,387 | 12/1976 | Knopf | 60/444 |
| 4,292,805 | 10/1981 | Acheson | 417/222 X |
| 4,600,364 | 7/1986 | Nakatani et al. | 60/452 X |
| 4,627,238 | 12/1986 | Mayr et al. | 60/452 |

Primary Examiner—Edward K. Look
Attorney, Agent, or Firm—Scully, Scott Murphy & Presser

[57] ABSTRACT

A control circuit for a reversible hydrostatic transmission including a reversible pump having first and second working lines, and a control member having forward and reverse positions to normally direct a working fluid through the first and second working lines respectively. A servo-motor has forward and reverse positions to hold the pump control member in either its forward or reverse positions, and a first subcircuit is provided to conduct a control fluid to the servo motor to hold that motor in either its first or second positions. This first subcircuit includes a pair of piston and cylinder units, with each of these units having a control pressure chamber and a working pressure chamber. A second subcircuit is provided to conduct the working fluid from the working lines to the working pressure chamber of either the first or second piston cylinder unit, and this second subcircuit includes a change over valve to insure that the working pressure is maintained in the appropriate working pressure chamber even if there is a sudden reversal in the load on the pump.

10 Claims, 1 Drawing Sheet

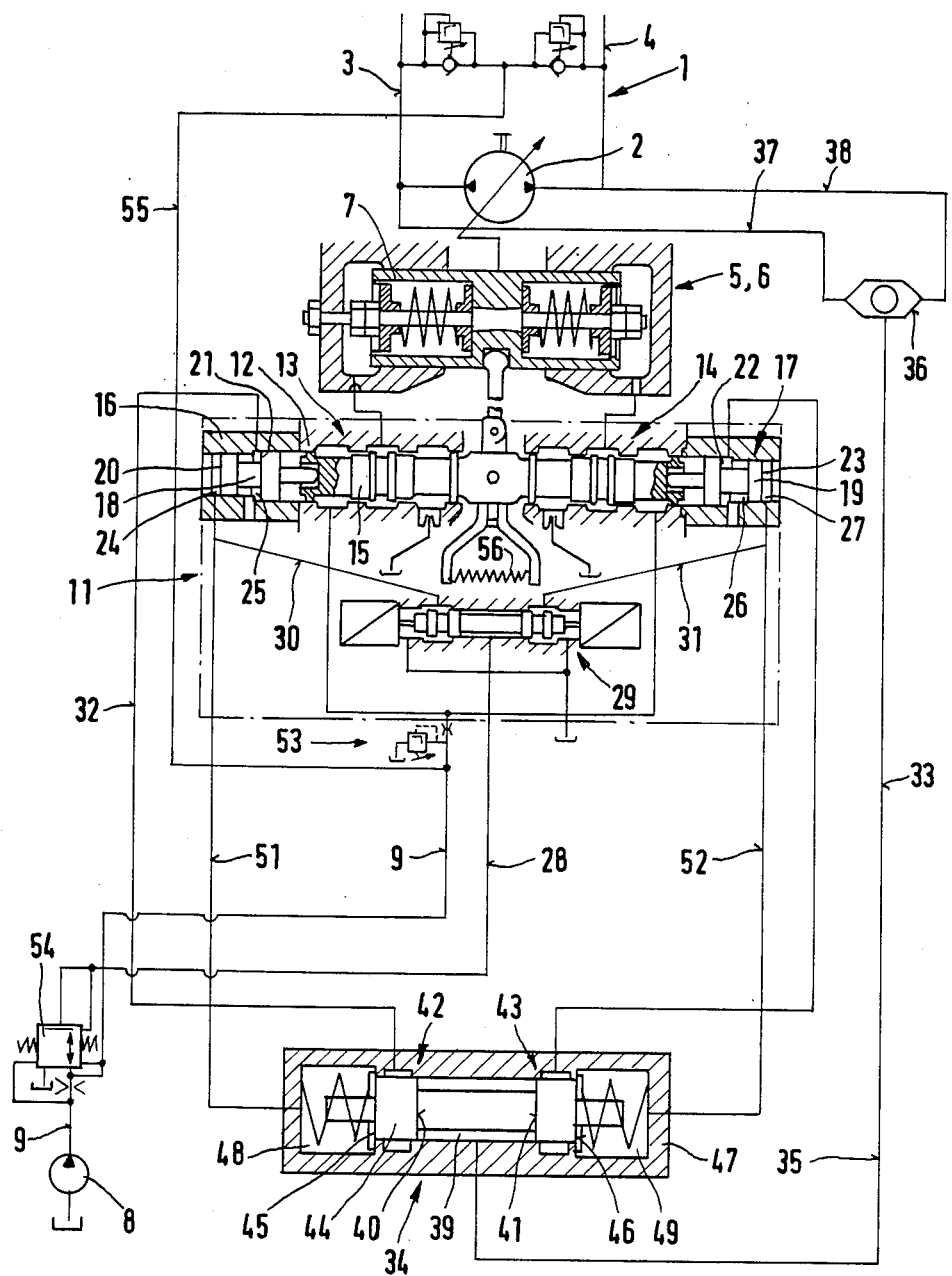

4,756,157

CONTROL DEVICE FOR A HYDROSTATIC GEAR

TECHNICAL FIELD OF THE INVENTION

The invention relates to a control device according to the preamble of claim 1.

BACKGROUND OF THE INVENTION AND PRIOR ART

Control devices of this kind are used to control the performance or to regulate a predeterminable speed of the hydrostatic gear depending on the speed of the driving motor. Preferred applications are devices and machines involving a robust, powerful and relatively small working drive, particularly construction vehicles such as cranes, winches, excavators, bulldozers, wheel loaders or the like where it is usual to use an existing driving unit for the travelling drive as well.

A control device of the above-mentioned kind is described and illustrated in German patent specification 30 41 856. This known construction is designed for reversible operation. Apart from this it exhibits the following disadvantage. When, in operation without any change in the delivery direction of the main pump or in the direction of travel, a load reversal occurs in the hydrostatic gear, i.e. in cases when the hydraulic motor assumes the function of a pump, as for example is the case when a load is lowered or when a constructional machine travels downhill, this control device does not operate satisfactorily. The cause of this is that on load reversal the working pressure in the working line concerned falls to a negligible level and hence the control piston of the piston-and-cylinder device moves the regulating valve in the sense of an increase in the intake volume of the main pump, which is now operating as a motor. The transmission ratio of the hydrostatic gear, and consequently also the braking effect of the driving motor, are thereby reduced. Thus the control device ceases to function and the driving motor begins to race.

OBJECT OF THE INVENTION

The object of the invention is to construct a control device of the above-mentioned kind so that racing of the driving motor when there is load reversal in the hydrostatic gear is prevented.

SUMMARY OF THE INVENTION

This object is achieved by the characterising feature of claim 1.

The construction according to the invention ensures that the control valve will function even after a load reversal in the hydrostatic gear, as described above, since in contrast to the known construction the pressure is maintained by the working pressure in the second working line even after the load reversal. This is controlled by the valve arrangement that blocks the connecting line leading to the working line in which at the time there is no working pressure. Thus the application of working pressure to the pressure chamber for the current direction of travel is controlled by the change-over valve according to the invention.

The features in claims 2 to 6 comprise simple constructional parts that can also be controlled simply and so as to operate reliably, and thus provide economical solutions.

A simple form of change-over valve according to claim 5 or claim 6 is, according to the invention, a double piston of which the annular space between facing control surfaces that form control edges is connected to the two-way valve, while the free end faces of the double piston can always be acted on by the control pressure. In a preferred embodiment the double piston is centred by springs.

The embodiment according to claim 5 makes a simple arrangement possible.

BRIEF DESCRIPTION OF THE DRAWINGS

The invention will now be described with reference to a hydraulic circuit diagram showing a preferred embodiment.

DETAILED DESCRIPTION OF A PREFERRED EMBODIMENT OF THE INVENTION

The circuit diagram shows a hydraulic gear indicated generally by 1, of which for simplicity only the main pump 2, which is designed for reversible operation and of which the delivery is adjustable, and the working lines 3, 4, are shown. The amount delivered by the main pump 2 can be adjusted by a servo-motor 5 which comprises a piston-and-cylinder unit 6 the spring-centred double piston 7 of which can be acted on by a control pressure produced in a control line 9 by an auxiliary pump 8, the action being on one or other of its end faces according to the direction of motion.

For controlling the servo-motor 5, there is provided a control device 11 comprising a spring-centred control valve 12 with one controllable passage 13, 14 for each direction of travel and a control piston 15. The displacement of the control piston 15 is effected by a piston arrangement which comprises two piston-and-cylinder units 16, 17 arranged at the ends of the control valve 12 and with pistons 18, 19 acting at any time on one end face of the control piston 15, each of said pistons 18, 19 being in the form of a stepped piston with two control surfaces 20, 21; 22, 23, of which those belonging to one piston 18, 19 point in the same direction, namely facing away from the control piston 15. The control surfaces 20, 21; 22, 23 of each piston 18, 19 bound pressure chambers 24, 25; 26, 27 of which the outer ones can be subjected to the control pressure and the inner ones to the working pressure of the hydrostatic gear 1.

For this purpose a control line 28 is provided, fed by the auxiliary pump 8, which is connected to the outer pressure chambers 24, 27 via an electromagnetically operated change-over valve 29 for setting the direction of travel and two control lines 30, 31 branching from the change-over valve 29.

The inner pressure chambers 25, 26, which can be subjected to the working pressure, are connected via control lines 32, 33 to a change-over valve 34 from which one control line 35 leads to a two-way valve 36 that is connected by two control lines 37, 38 to the working lines 3, 4 of the hydrostatic gear.

The change-over valve 34 is a spring-centred double piston of which the annular faces 40, 41, which face one another and bound an annular space 39, open or close the connection 42, 43 to the control lines 32, 33 according to the position of the double piston 44. At the free end faces 45, 46 of the double piston 44 pressure chambers 48, 49 are formed in the housing 47 of the change-over valve 34, one of these being connected via a control line 51 to the control line 30 and the other via a control line 52 to the control line 31.

In the control line 9 there is arranged a regulating valve 54 according to German Patent Specification 22

47 437, to which reference is made for the construction and functioning of the regulating valve 54. A feed line 55, serving in known manner to feed the hydrostatic gear 1, branches from the control line 9. The control pressure in the control line 28 is reduced relative to the pressure in the control line 9 and the feed line 55. In the control line 9 there is also provided a pressure-limiting valve to safeguard the control device 11 and the servomotor 5.

In operation, the setting of the change-over valve 29 determines the side to which the control member of the main pump 2 swings and operates. Because of the connection of the outer pressure chambers 24, 27 of the piston-and-cylinder units 16, 17 to the pressure chambers 48, 49 of the change-over valve 34, the double piston 44 of the latter opens one of the passages 42, 43 when control pressure is supplied to one of the outer pressure chambers 48, 49. The arrangement is such that the inner pressure chamber 25, 26 remote from the outer pressure chamber that is under pressure at any given time is subjected to the working pressure. Thus control surfaces 20, 22 or 21, 23 act in opposition, from which the control position of the control piston 15 results, taking into account the strength of the valve spring (valve spring 56).

According to the direction of delivery of the main pump 2, one working line 3, 4 is under high pressure and the other is under a low and negligible pressure. In the arrangement according to the invention the two-way valve 36 ensures that even on load reversal in the hydrostatic gear 1 the piston 18, 19 concerned continues to be acted on by high pressure.

That is to say, even after a load reversal in the hydrostatic gear 1 the control function applied to the control valve 12 remains substantially unchanged. In contrast to the state of the art, in the embodiment according to the invention an increase in the working pressure leads to adjustment of the main pump 2 to deliver a smaller amount. In such a case the transmission ratio of the hydrostatic gear 1 is increased, resulting in an increased braking action of the motor (not shown) driving the main pump 2.

What is claimed is:

1. A control circuit for a reversible hydrostatic transmission including a reversible pump having first and second working lines, and a control member having a forward position wherein a pressurized working fluid is normally directed to the first working line, and a reverse position wherein the pressurized working fluid is normally directed to the second working line, the control circuit comprising:
    a servo motor having a forward position to hold the control member in the forward position thereof, and a reverse position to hold the control member in the reverse position thereof;
    a source of a pressurized control fluid;
    a first subcircuit to conduct the control fluid from the source thereof to the servo motor, and including
    (i) a first control valve having a first position to conduct the control fluid to the servo motor to hold the servo motor in the forward position thereof, and a second position to conduct the control fluid to the servo motor to hold the servo motor in the second position thereof, the first control valve having first and second, oppositely acting piston and cylinder units, each piston and cylinder unit having a control pressure chamber and a working pressure chamber,
    (ii) a second control valve having a first position to conduct the control fluid from the source thereof to the control pressure chamber of the first piston and cylinder unit to hold the first control valve in the second position thereof, and having a second position to conduct the control fluid from the source thereof to the control pressure chamber of the second piston and cylinder unit to hold the first control valve in the second position thereof, and
    means to move the second control valve between the first and second positions thereof; and
    a second subcircuit to conduct the working fluid from the working lines to the working pressure chamber of the first piston and cylinder unit when the first control valve is in the second position thereof, and to conduct the working fluid from the working lines to the working pressure chamber of the second piston and cylinder unit when the first control valve is in the first position thereof, the second subcircuit including
    (i) a change over valve having a first position to conduct the working fluid to the working chamber of the first piston and cylinder unit, and a second position to conduct the working fluid to the working chamber of the second piston and cylinder unit,
    (ii) fluid conducting means to conduct the working fluid from the first and second working lines to the change over valve, and including valve means to conduct the working fluid from the first working line to the change over valve when the pressure of the working fluid in the first working line exceeds the pressure of the working fluid in the second working line, and to conduct the working fluid from the second working line to the change over valve when the pressure of the working fluid in the second working line exceeds the pressure of the working fluid in the first working line, and
    (iii) means to maintain the change over valve in the first position thereof when the first control valve is in the second position thereof, and to maintain the change over valve in the second position thereof when the first control valve is in the first position thereof.

2. A control circuit according to claim 1, wherein the valve means is a non-return valve means.

3. A control circuit according to claim 2, wherein the valve means is a two-way valve.

4. A control circuit according to claim 1, wherein the control fluid is selectively conducted to the change over valve to move the change over valve between the first and second positions thereof.

5. A control circuit according to claim 4, wherein the change over valve has first and second control pressure chambers; and the means to maintain the change over valve includes
    (i) a first fluid line connected to and in fluid communication with the pressure control chamber of the first piston and cylinder unit and the first control pressure chamber of the change over valve, and
    (ii) a second fluid line connected to and in fluid communication with the pressure control chamber of the second piston and cylinder unit and the second control pressure chamber of the change over valve.

6. A control circuit according to claim 3, wherein the second control valve is a two-way valve.

7. A control circuit according to claim 1, wherein at any given time when the control pressure chamber of one of the piston and cylinder unit is subjected to the pressure of the control fluid, the working pressure chamber of the other of the piston and cylinder units is subjected to the pressure of the working fluid.

8. A control circuit according to claim 4, wherein the change over valve includes:
   an outer cylinder;
   a double piston movably supported in the outer cylinder; and
   spring means biasing the double piston toward a centered position in the outer cylinder.

9. A control circuit according to claim 5, wherein the change over valve includes:
   an outer cylinder;
   a double piston movably supported in the outer cylinder; and
   spring means biasing the double piston toward a centered position in the outer cylinder.

10. A control circuit according to claim 6, wherein the change over valve includes:
   an outer cylinder;
   a double piston movably supported in the outer cylinder; and
   spring means biasing the double piston toward a centered position in the outer cylinder.

* * * * *